United States Patent [19]

Shih

[11] Patent Number: 4,857,781

[45] Date of Patent: Aug. 15, 1989

[54] HIGH-SPEED NON-CONTACT LINEAR MOTOR WITH MAGNETIC LEVITATION

[75] Inventor: Liang Shih, Rochester, N.Y.

[73] Assignee: Eastman Kodak Company, Rochester, N.Y.

[21] Appl. No.: 218,179

[22] Filed: Jul. 13, 1988

[51] Int. Cl.⁴ .................. H02K 41/02; G11B 7/09
[52] U.S. Cl. .................... 310/12; 310/90.5; 369/45
[58] Field of Search ............ 310/12, 90.5; 369/43, 369/44, 45; 360/75, 78.12, 78.13

[56] References Cited

U.S. PATENT DOCUMENTS

| 4,156,548 | 5/1979 | Anderson et al. | 310/90.5 |
| 4,334,207 | 6/1982 | Bill et al. | 336/136 |
| 4,689,529 | 8/1987 | Higuichi | 318/135 |

FOREIGN PATENT DOCUMENTS

| 0041449 | 3/1983 | Japan | 369/45 |
| 0056237 | 4/1983 | Japan | 369/45 |
| 0085446 | 5/1985 | Japan | 369/44 |
| 0142537 | 6/1986 | Japan | 369/45 |

Primary Examiner—Patrick R. Salce
Assistant Examiner—Judson H. Jones
Attorney, Agent, or Firm—Edward Dugas

[57] ABSTRACT

A linear brushless DC motor is provided with a stationary member and a movable member each having opposing pole faces. A first magnetic device operates to displace the movable member translationally with respect to the stationary member. A second magnetic device which has electromagnet windings wound around each of the pole faces operates to levitate the movable member by magnetic attractive force with respect to the stationary member. A control system is used for maintaining a certain air gap between the movable member and the stationary member.

8 Claims, 7 Drawing Sheets

HIGH-SPEED NON-CONTACT LINEAR MOTOR WITH MAGNETIC LEVITATION

BACKGROUND OF THE INVENTION

1. Field of the Invention

The present invention relates to a linear motor which utilizes a magnetic field to support the movable member and incorporates a voice coil as the linear motor to induce a non-contact motion to the movable member.

2. Description of the Prior Art

Linear type actuators find particular utility in disk drives where they are used to position magnetic and/or optical type heads above a track of the disk to perform either a read or a write function. In such an application, the speed of positioning the head is crucial and once the head is positioned at the desired position the maintaining of the head at that position without high frequency vibration and head runaway is important. Head runaway is caused after an external shock disturbs the head from its tracking position. The speed of positioning a linear actuator is influenced by friction losses. Various types of mechanical and fluid actuators have been devised using, for example, either oil or air to freely support the movable member.

A linear motor of particular interest is disclosed in U.S. Pat. No. 4,689,529 entitled "Linear Stepping Motor" by T. Higuichi. The motor of that patent utilizes a magnetic field for suspending the movable member in a floating state. Magnetic poles are positioned on the movable member and/or the support member and are actuated in a step fashion in accordance with the desired positioning of the movable member. Because the motor is a stepping motor, a plurality of evenly spaced pole faces are required. The motion of the stepping motor is such that it moves from one pole pair to the next pole pair under the influence of a control signal. Additionally, there is provided a displacement sensor which measures the gap between the movable member and the stationary member to provide a displacement signal the magnitude of which indicates the distance of the movable member from a desired support or levitated position. The displacement signal is used to increase and/or decrease the strength of the magnetic field used to suspend the movable member. Traditionally, stepping motors do not provide a smooth transition from a start position to the desired end position. Therefore, where smoothness of motion is a requirement, something other than a stepping motor is required. The present invention fills the smoothness requirement.

Another patent of particular interest is U.S. Pat. No. 4,334,207, entitled "Linear Displacement Transducer" by C.S. Bill et al. In the transducer of that patent the linear displacement member is supported by fixed magnetic fields in a floating position. The floating position maintains a substantially constant gap. Windings are positioned on the supporting member and are in one embodiment positioned on the moving member. The windings receive an AC signal which causes Eddy currents that modify the flux between the windings causing in turn the movable member to move bilinearly within the supporting magnetic fields.

The present invention is directed towards achieving an increase in the smoothness of the positioning of the linear movable member and in the speed at which the movable member reaches its final destination and, additionally, in maintaining a high degree of physical rigidity once the movable member has reached the desired position.

SUMMARY OF THE INVENTION

In a preferred embodiment of the invention, an elongated movable member having a substantially rectangular cross section is levitated by a variable strength magnetic field that is responsive to a displacement signal. The displacement signal indicates the amount of displacement of the movable member from a stationary member. The stationary member is formed with an upper portion and a lower portion positioned adjacent the opposite surfaces of the movable member with the upper and the lower portion of the stationary member having a permanent magnet affixed thereto for generating a magnetic field between the portions. An electrogmagnet is wound onto the central portion of the movable member such that the application of a current to the electromagnet causes the movable member to move translationaly with respect to the stationary member.

Accordingly, it is primary object of the present invention to provide an improved linear motor.

It is another object of the present invention to provide a linear motor which provides smoothness and speed in its movement.

It is another object of the present invention to provide a linear motor which quickly moves to a desired position and then locks into the desired position with a high degree of rigidity.

These and other objects of the present invention will become more apparent when taken in conjunction with the following description and drawings wherein like characters indicate like parts and which drawings form a part of the present application.

BRIEF DESCRIPTION OF THE DRAWINGS

FIG. 13 is a sectioned view of a fourth embodiment of a linear motor of the type illustrated in FIG. 9.

DETAILED DESCRIPTION OF THE PREFERRED EMBODIMENTS

Figure 1:
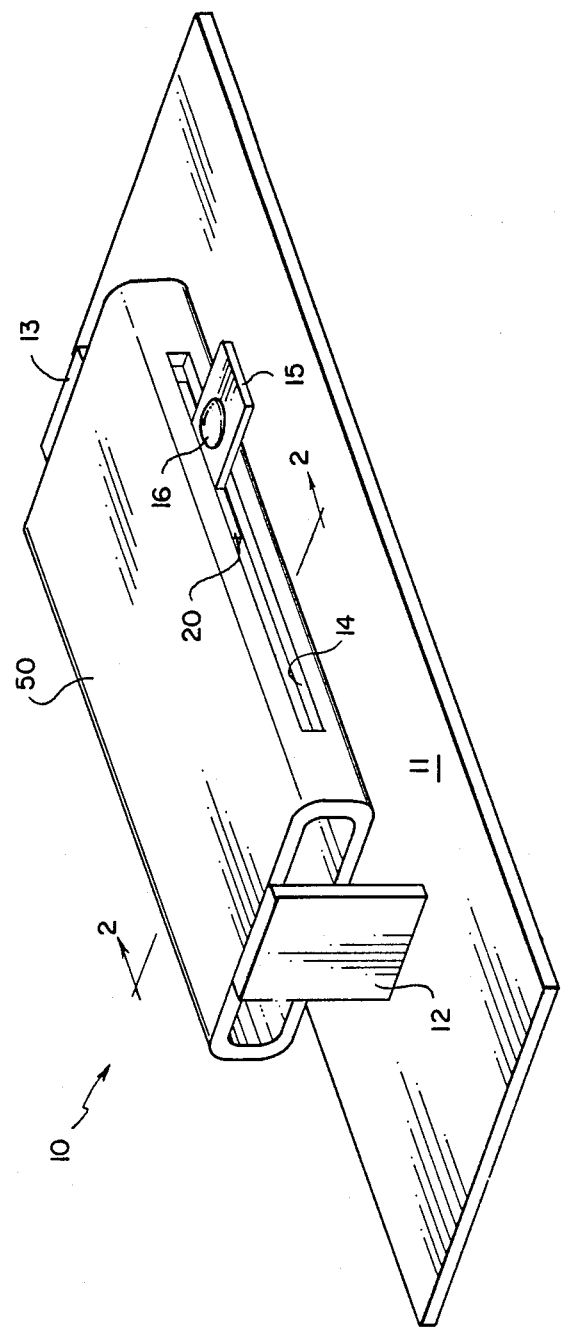
FIG. 1 is a perspective view of one preferred embodiment of a linear motor.

In FIG. 1 there is shown, a linear motor 10 that is mounted to a reference structure 11 by means of end support plates 12 and 13. A movable carriage member 20, supporting an objective lens assembly 16 via an arm 15 is magnetically levitated within a fixture member 50.

A slot 14 is provided in the side of the fixture member 50 to permit the carriage 20 to be driven from one end of the fixture member to the other end. The objective lens assembly 16 can thereby be moved to different positions along the slot 14 to focus on, for example, different tracks of a video disk.

Figure 2:
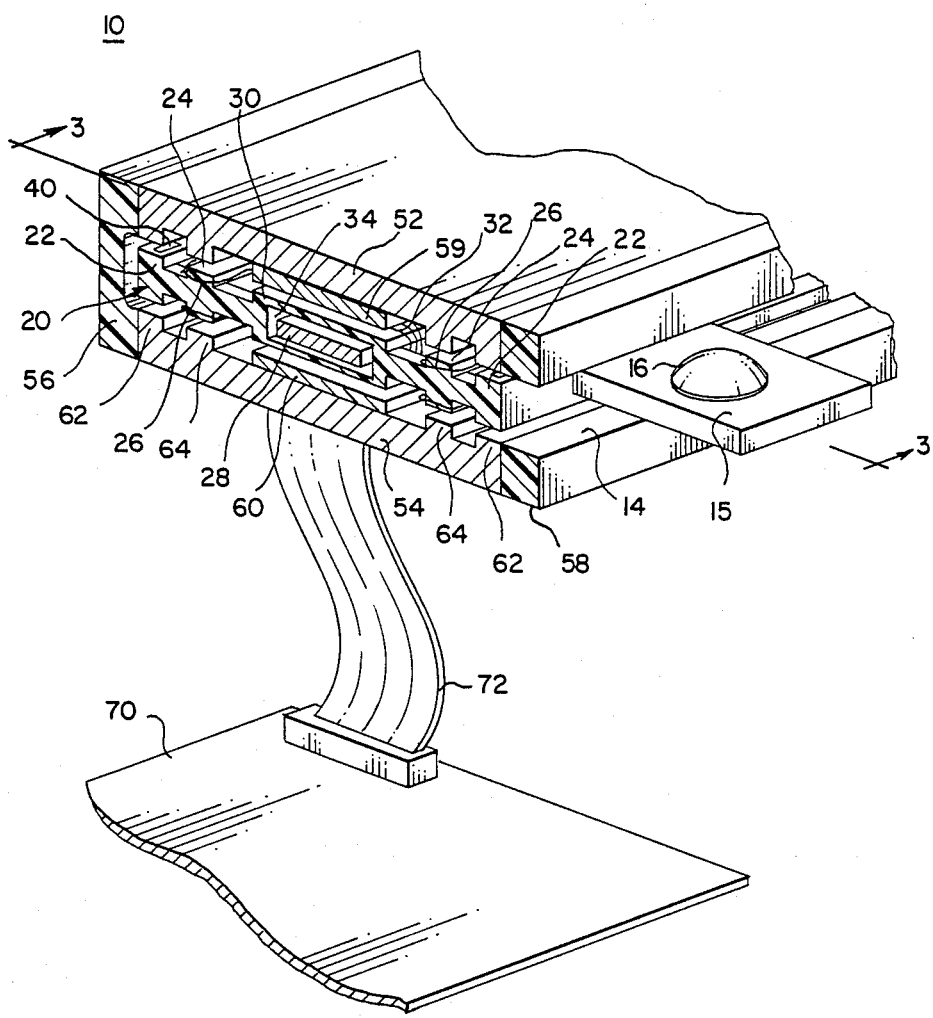
FIG. 2 is a cutaway perspective view of the linear motor of FIG. 1 coupled to a control board by means of a flexible cable.
Figure 3:
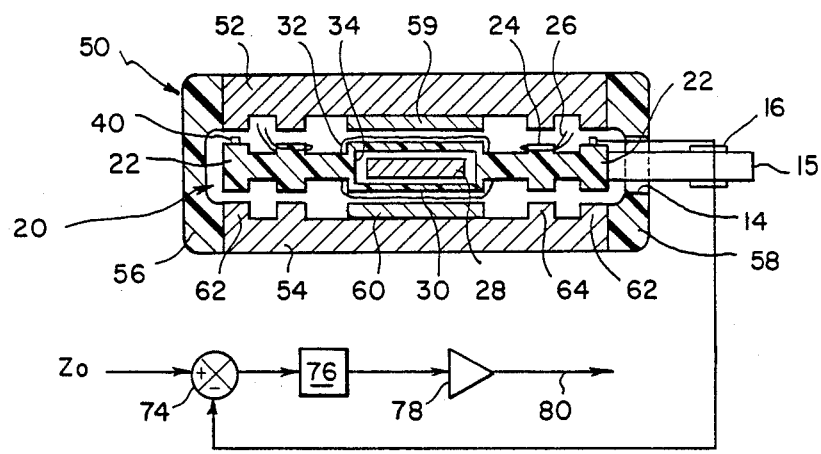
FIG. 3 is an end view taken along the section lines 3—3 of FIG. 2.
Figure 4:
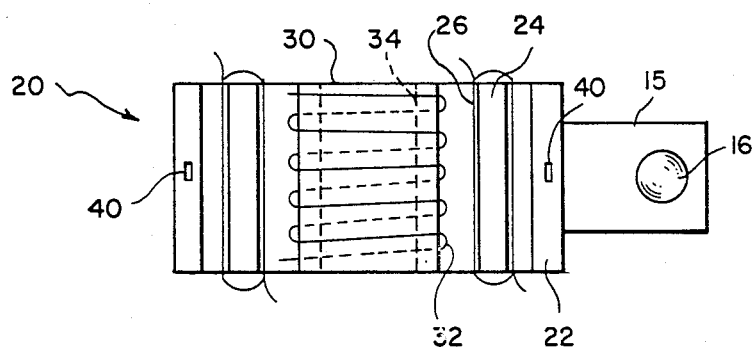
FIG. 4 is a top view of the carriage portion of the linear motor of FIG. 1.

Referring to FIGS. 2, 3 and 4 wherein the internal construction of the linear motor 10 is illustrated in detail with the carriage member 20 encircled by the fixture member 50. The fixture member 50 has an upper portion 52 and a lower portion 54. These portions are made of magnetizable ferrous material and are held in a spaced-apart relationship, parallel to each other by side members 56 and 58. The side members 56 and 58 are formed from an insulating-type material. Positioned on the inner surface of the upper portion 52 and the lower portion 54 is a pair of permanent magnets 59 and 60, respectively. Formed on the inner surfaces of the upper and the lower portions 52 and 54, respectively, are pole face pairs 62 and 64 which are designed to face corresponding pole faces 22 and 24 formed in the outer regions of the carriage member 20. Electromagnet windings 26 are wound around each of the pole faces 24. These windings, when energized, form a magnetic attraction field which supports (levitates) the carriage member 20 against gravity and within the fixture 50. Positioned on each pole face 22 is a displacement sensor 40 for detecting the displacement of the carriage member 20 within the opening between the upper and the lower portion 52 and 54, respectively, of the fixture 50 and for providing a signal representative of the displacement.

An electronic control board 70, containing levitating electronics and the power to provide the current demands of the various electromagnets, is interconnected by means of a flexible cable 72 to the various coils and sensors thus far identified. The signals from the displacement sensors 40 are each directed to a difference circuit 74 which difference circuit provides an error output signal that is proportional to the difference between a signal $Z_0$ corresponding to the desired position of the carriage member within the fixture member 50, and the signal from the displacement sensor. The error signal is then directed to a controller 76. The controller 76 functions in the standard closed loop servomechanism fashion to provide an output signal to an amplifier 78 which output signal in turn causes the amplifier 78 to forward the correct drive current, along conductor 80, to the appropriate levitating coil winding 26 to cause the carriage member 20 to be moved towards and held in the correct position within the fixture 50 which in turn causes the displacement (error) signal to drive towards 0.

Each displacement sensor 40 is coupled to identical control electronics for controlling the current through an associated levitating coil winding 26.

The carriage member 20 has a central rectangular body portion 30 defining an opening 34 through which is inserted a rectangular bar 28 made from a ferrous material. Wound around the central member 30 is an electromagnet coil 32. The electromagnet coil 32, operating in conjunction with the permanent magnets 59 and 60, forms a linear motor for providing relative movement between the carriage member 20 and the fixture member 50.

Figure 5:
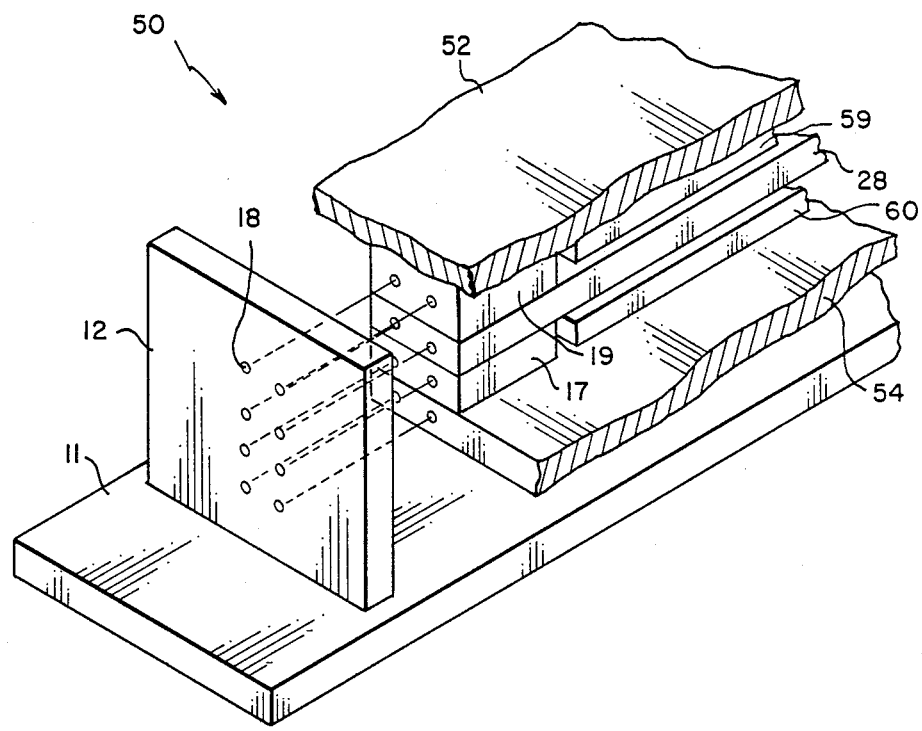
FIG. 5 is an exploded view of a portion of the linear motor of FIG. 1.

In FIG. 5, the upper and the lower portion 52 and 54 of the fixture 50 are shown attached to the end support plate 12 by means of fasteners 18. The rectangular bar 28 is firmly center mounted between the permanent magnets 59 and 60 by means of spacers 17 and 19. Fasteners 18 are used to mount all members 17, 19 and 28 to the end support plate 12. At the other end of the linear motor, the end support plate 13 is affixed to the members 17, 19, 28, 52 and 54 by fasteners 18.

In operation then, the carriage member 20 is levitated within the fixture 50 and either the fixture is held rigid to a reference and/or the carriage is held rigid to a reference and the coils 32 of the linear motor are energized to provide a driving motion therebetween. Once the movable member has reached a desired position, the signal $Z_0$ may be replaced with a bottoming signal which causes the carriage 20 to firmly sit against the inner surface of the fixture 50 to magnetically lock the two assemblies together.

Figure 6:
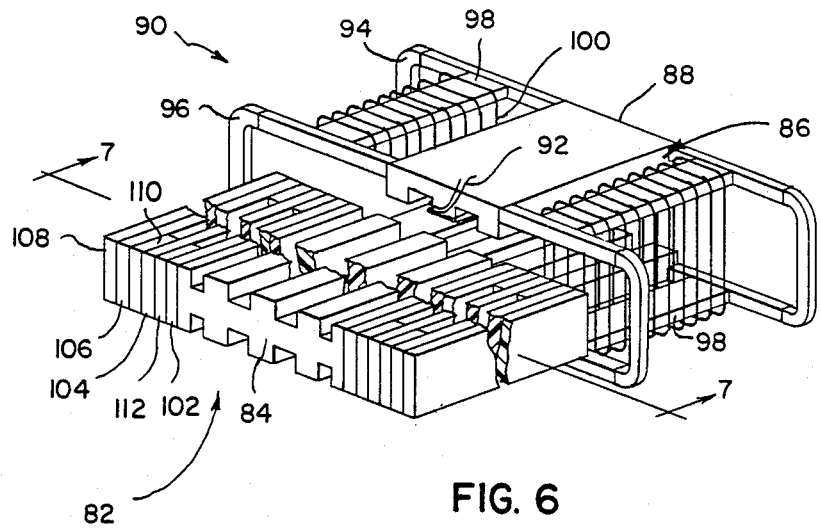
FIG. 6 is a cutaway perspective view of a second embodiment of a linear motor.
Figure 7:
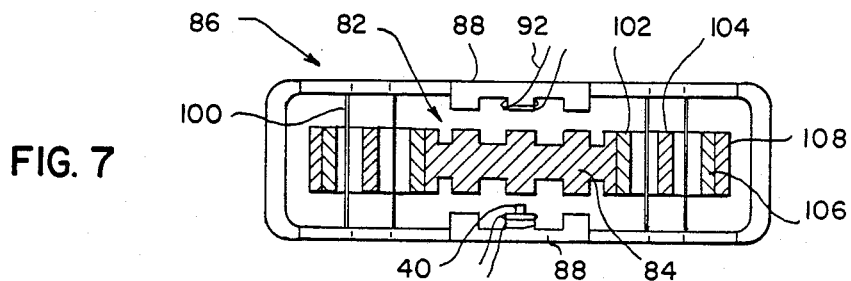
FIG. 7 is a partially sectioned view taken along the section lines 7—7 of FIG. 6.
Figure 8:
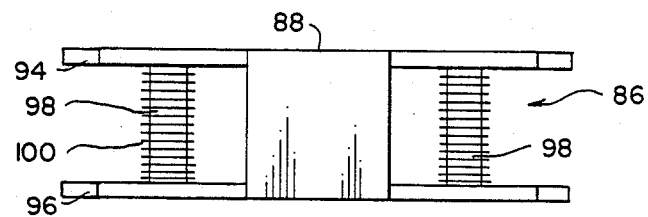
FIG. 8 is a top view of the support member shown in the embodiment of FIGS. 6 and 7.

Referring now to FIGS. 6, 7 and 8 wherein is shown a second embodiment of the linear motor of the present invention. The non-moving portion 82 of the linear motor 90 is shown formed with a central core member 84 having a cross-section equivalent to back-to-back E pole faces. These pole faces correspond to the pole faces on a pair of E core electromagnets 88. Rectangular bars 102 and 106 of permanent magnetic material are positioned in a spaced-apart relationship from the central core member 84. Rectangular bars 104 and 108 are formed of a ferrous material with the permanent magnet bars 106 being abutted to the rectangular bars 108. The bars 102 and 106 and the bars 108 and 104 are held parallel to each other and the central member 84 by means of spacer blocks 110 and 112 located at each end of the non-moving portion 82.

The movable portion 86 is formed of a front rectangular frame 96 and a back rectangular frame 94 between which is positioned two pairs of coil supports 98. Coil windings on the coil supports 98 form electromagnets 100. The coil windings extend into the spacing between the permanent magnets 102 and 106 on either side of the rectangular bar member 104. As can more clearly be seen in FIGS. 7 and 8, the E core electromagnets 88 also extend between the frame members 94 and 96 on opposite sides of the central member 84 and have coil windings 92 wound around the center pole face. The electromagnets 100, cooperating with the permanent magnets 102 and 106, provide the linear motion to the movable member 86 while the E core electromagnets 88 provide the levitating force to maintain the spacing between the moving member 86 and the non-moving member 82 at some relative preselected constant.

A sensing means 40, as per the description of the preceding embodiment, senses the spacing between the moving member 86 and the non-moving member 82 and provides a signal which is a function of that spacing. That provided signal is processed and is used to provide a driving current to the coil windings 92 of the electromagnets 88 to provide the desired degree of levitation.

Figure 9:
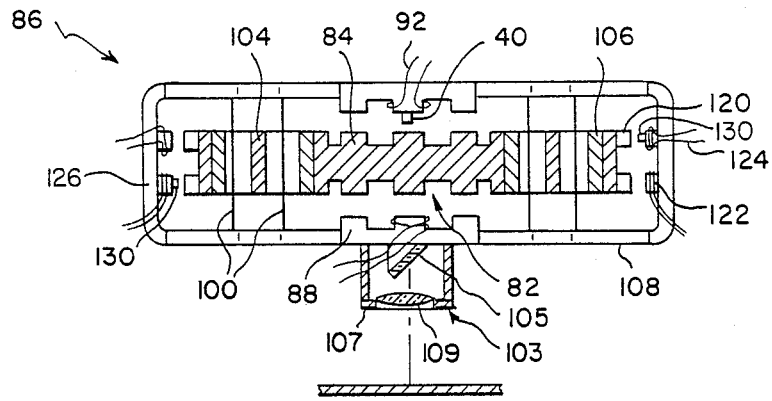
FIG. 9 is a sectioned view of a third embodiment of a linear motor.
Figure 10:
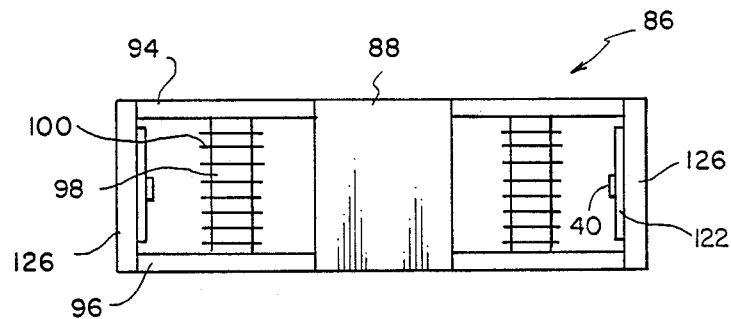
FIG. 10 is a top view of the support assembly of the linear motor of FIG. 9.

Referring now to FIGS. 9, and 10 wherein a third embodiment of the present invention is illustrated having a central stationary member 82 encircled by a movable member 86. This embodiment is similar to the embodiment that is shown in FIGS. 6, 7 and 8 with the addition of pairs of pole faces 120 positioned onto the outer surface of the bar members 108 and pairs of pole faces 122 positioned on the inner surface of a support member 126 connected between the frame members 94 and 96. Electromagnet coils 124 are wound onto the pole faces 122. The electromagnets, formed with coils 124, are utilized to rigidly retain the movable member 86 at a central position around the stationary member 82. The movable member 86 is thus constrained in five degrees of freedom permitting only one degree of freedom and that is along the translational axis which corresponds to its elongated physical axis. In other words, for a three-axis coordinate system X, Y and Z, the movable member 86 can move along the X-axis only (assuming the X-axis is the long axis of the stationary member 82. The electromagnets 88 and windings 124 hold the movable member rigidly in the Y and Z axis directions along with holding it rigidly with respect to pitch, roll and yaw about the Y, Z and X axes, respectively.

Also added to this embodiment is a sensor 130 which senses the spacing between the pole faces 120 and 122 to provide a signal which is a function of that spacing. The provided signal is used to properly adjust the current through the coils 124 to maintain the spacing at a preselected value. The sensor 130 can be the same type of sensor used as element 40 for detecting the levitating position of the movable member 86 with respect to the stationary member 82.

An objective lens assembly 103 is mounted to the movable member 86 at a central position on the back of one of the E core electromagnets 88. The assembly 103 is comprised of: a 45° mirror 105 which deflects the optical axis of the lens assembly 90° to clear the movable member 86, a lens array (one shown) 109 for focusing on images, and a support housing 107 for holding the mirror and the lens array. In operation, the levitation of the movable member 86 controls the focusing of the lens assembly 103.

Figure 11:
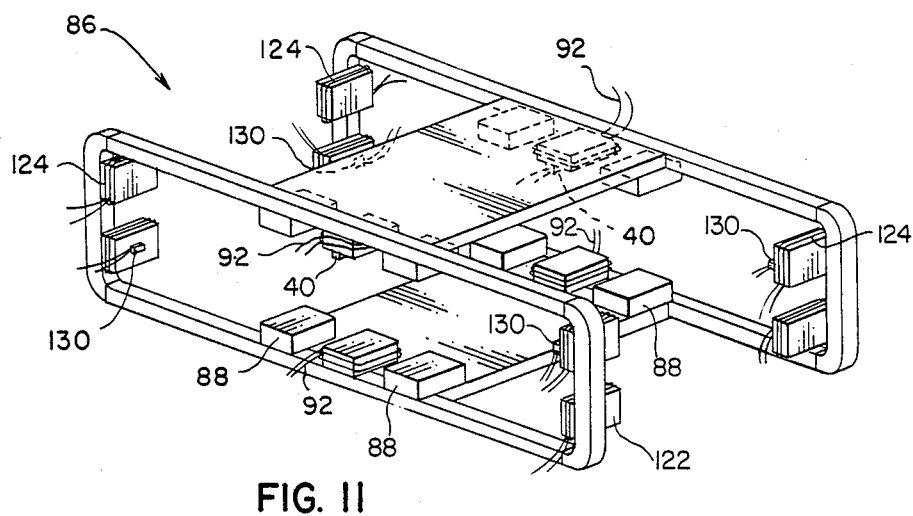
FIG. 11 is a partially phantom view of an embodiment of the carriage of a linear motor.

The FIG. 11 embodiment uses the same components as the FIGS. 9 and 10 embodiment with the individual pole pieces being shorter along their long axis.

Figure 12:
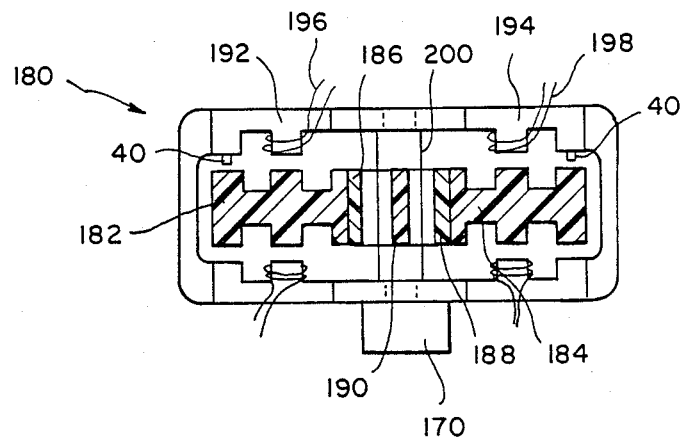

Referring now to FIG. 12 wherein is shown a fifth embodiment of the invention incorporating an outer fixture member 180 onto which is mounted a lens assembly 170. The outer fixture 180 has the E core portion of the levitating electromagnets split into two magnet cores 192 and 194, with coils 196 and 198 wound therearound, respectively. The central member is reversed in this embodiment with pole faces members 182 and 184 being split apart from the central area. The central area contains instead the permanent magnets 188 and 186 along with the ferrous rectangular bar member 190. Motor coil windings 200 extend into the spacing between the permanent magnets 186 and 188 on either side of the rectangular bar member 190 to provide the linear motor force for driving the movable member 180 with respect to the inner members. Rigid spacers (not shown) interconnect members 182, 184, 188, 190 and 186 at their respective ends to form the stationary member similar to the spacers 110 and 112 of FIG. 6.

Sensors 40 provide the signals that are a function of the spacing of the central members within the movable member 180 which in turn corresponds to the distance the lens 170 is from a recording and/or reading surface. The sensor signals are adjusted as a function of the focus of the lens 170.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as may fall within the true scope of the invention.

I claim:

1. A linear motor comprising:
   a first member having a substantially rectangular cross section and an elongated shape;
   a second member, having an upper portion formed from a magnetic material, a lower portion formed from a magnetic material and a pair of side portions formed from non-magnetic material for rigidly holding said upper portion and said lower portion in a spaced configuration to define a substantially rectangular opening for receiving said first member;
   a first permanent magnet affixed to said upper portion of said second member;
   a second permanent magnet affixed to said lower portion of said second member;
   a motor winding affixed to said first member for generating a magnetic field for inducing relative motion between said first and said second members along the elongated axis of said first member in response to a position signal;
   sensing means for sensing the spacing of said first member within the defined opening of said second member and for providing a signal indicative of the sensed spacing; and
   magnetic means responsive to the signal provided by said sensing means for maintaining a desired spacing between said first member and said second member.

2. The linear motor according to claim 1 wherein said first member is configured with a centrally open portion through which is mounted a bar of ferrous material for providing a path for the return of the magnetic field generated by said motor winding.

3. The linear motor according to claim 1 wherein said first member is comprised of:
   an elongated central member;
   first and second elongated outer members; and
   first and second end plates affixed to first and second ends of said central member and said first and said second outer members to rigidly maintain said outer members parallel on opposite sides of said central member.

4. The linear motor according to claim 3 wherein said sensing means is affixed to said first and said second elongated outer members, and wherein said motor winding is wound around said elongated central member.

5. A high-speed linear brushless DC motor comprising:
   a first member comprising: a pair of spaced-apart levitating electromagnets, a frame member rigidly maintaining said pair of electromagnets a spaced distance apart, and a first and a second motor coil wound onto said frame member and insulated from said levitating electromagnets;
   a second member comprising: pole faces proximately positioned to said electromagnets for levitating said first member, permanent magnets proximately positioned to said first and said second motor coil for causing a linear motor action between said first and said second member;
   servomechanism means coupled to said pair of levitating electromagnets for providing a current for maintaining the distance between said first and said second member at a fixed distance thereby levitating said first member; and pairs of electromagnets positioned on said first and said second member to restrict the movement of said first member with respect to said second member to a desired linear axis.

6. A high-speed linear brushless DC motor comprising:
- a first member comprising: a pair of spaced-apart levitating electromagnets, a frame member rigidly maintaining said pair of electromagnets a spaced distance apart, and a first and a second motor coil wound onto said frame member and insulated from said levitating electromagnets;
- a second member comprising: pole faces proximately positioned to said electromagnets for levitating said first member, permanent magnets proximately positioned to said first and said second motor coil for causing a linear motor action between said first and said second member;
- servomechanism means coupled to said pair of levitating electromagnets for providing a current for maintaining the distance between said first and said second member at a fixed distance thereby levitating said first member;
- wherein said second member is comprised of: a central, elongated, ferro-magnetic body having first permanent magnets affixed to opposite edges and second permanent magnets mounted to the opposite edges in a spaced-apart relationship; and
- bars of ferrous material within the space between the first and second pairs of permanent magnets.

7. A high-speed linear brushless DC motor according to claim 6 wherein said first and said second motor coils are each wound with an open center and wherein at least one bar of ferrous material is positioned within the open center of a respective one of said motor coils.

8. A high-speed linear brushless DC motor according to claim 5 and further comprising:
- lens means affixed to said first member for focusing on an image plane; and
- means for adjusting the levitation of said first member on said second member as a function of the focus of said lens means.

* * * * *